United States Patent Office 3,816,385
Patented June 11, 1974

3,816,385
[ILE³,LEU⁴]-VASOPRESSIN ANALOGS AND INTERMEDIATES
Dieter Gillessen, Birsfelden, Josef Rudinger, Zurich, and Rolf Studer, Bottmingen, Switzerland, assignors to Hoffmann-La Roche Inc., Nutley, N.J.
No Drawing. Filed June 1, 1972, Ser. No. 260,022
Int. Cl. A61k 27/00; C07c 103/52; C07g 7/00
U.S. Cl. 260—112.5      16 Claims

ABSTRACT OF THE DISCLOSURE

Diuretically active nonapeptides which are analogs of vasopressin are disclosed. Particular embodiments include [Ile³,Leu⁴] - arginine-vasopressin and [Ile³,Leu⁴]-lysine-vasopressin. Intermediates useful in the preparation of the above compounds are also disclosed.

DESCRIPTION OF THE INVENTION

The present invention relates to nonapeptides which are analogs of vasopressin and to intermediates which are useful in the preparation thereof.

The nonapeptides provided by the present invention are compounds of the general formula

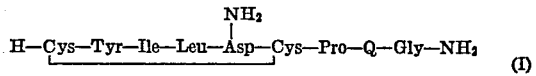

wherein Q is the residue of arginine or lysine.

and their pharmaceutically useful non-toxic acid addition salts.

The compounds of formula I, which may also be represented by the formulae

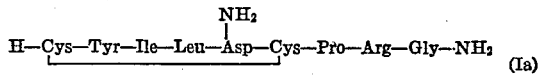

and

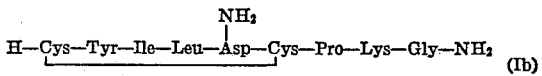

are analogs of the neurohypophysal hormones occurring in nature; for example, of arginine- or lysine-vasopressin of the formulae

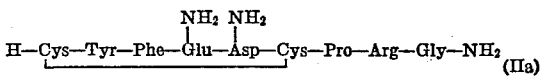

and

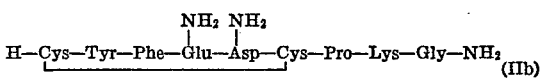

In contrast to the vasopressins occurring in nature, the compounds provided by the present invention are characterized by the replacement of the amino-acids phenylalanine and glutamine by isoleucine and leucine. They may, accordingly, be referred to as [Ile³,Leu⁴]-arginine-vasopressin and [Ile³,Leu⁴]-lysine-vasopressin respectively.

The abbreviations used in the present specification for the individual amino-acids and their protecting groups are those which are customary in peptide chemistry and which are known generally in the art [see Schröder, E. and Lübke, K.,: The Peptides, Academic Press, New York & London, Vol. I (1965) and Vol. II (1966 and IUPAC-IUB Rules]. They are therefore not defined further in this specification.

Unless expressly indicated otherwise, the optically active amino acids described in the specification and in the claims always have the L-configuration.

Examples of pharmaceutically useful non-toxic acid addition salts are salts with inorganic acids, such as the mineral acids, for example, hydrochloric acid, hydrobromic acid, phosphoric acid, sulfuric acid and perchloric acid or with organic acids such as the mono-or dibasic carboxylic acids, for example, acetic acid, oxalic acid, maleic acid, malic acid, tartaric acid and citric acid.

The nonapeptides of the instant invention (that is to say, the compounds of formula I and their pharmaceutically useful non-toxic acid addition salts) may be conveniently prepared by alternate procedures.

Thus in one embodiment cleaving off the protecting groups from a peptide of the general formula

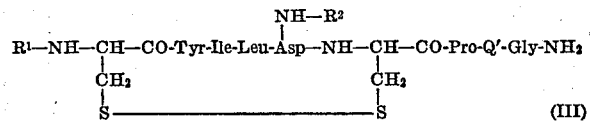

wherein R¹ is a hydrogen atom or an amino-protecting group; R² is a hydrogen atom or an amide-protecting group and Q′ is a grouping of the formula

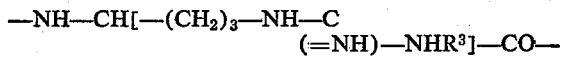

or

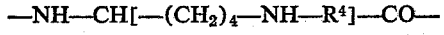

in which R³ is a hydrogen atom or a group protecting the guanidine residue and R⁴ is a hydrogen atom or an amino-protecting group protecting the lysine residue (provided that at least one of R¹, R² and R³ or R⁴ represents a protecting group).

and, if desired, converting the product obtained into a pharmaceutically useful non-toxic acid addition salt by treatment with an inorganic or organic acid, will yield the compounds of the invention.

In a further embodiment, a peptide of the general formula

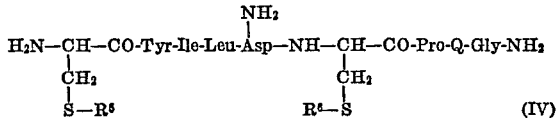

wherein Q is as above and R⁵ and R⁶ each are a hydrogen atom or a sulphydryl-protecting group.

is oxidized with the simultaneous or prior cleaving-off of any protecting group which may be present and, if desired, the product obtained is converted into a pharmaceutically useful non-toxic acid addition salt by treatment with an organic or inorganic acid.

Additionally, the instant compounds may be obtained by oxidizing a peptide of the general formula

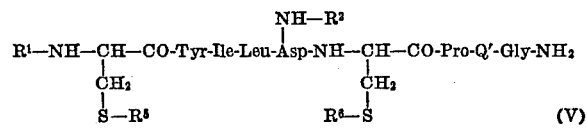

wherein R¹, R², Q′, R³, R⁴, R⁵ and R⁶ are as above with the simultaneous cleaving-off of the protecting group(s) and, if desired, the product obtained is converted into a pharmaceutically useful non-toxic acid addition salt by treatment with an organic or inorganic acid.

The oxidation of a peptide of formula IV or V can be carried out in a known manner (see, for example, Schröeder-Lübke, Vol. I, page 275 ff.), preferably in aqueous or aqueous-organic solution by the introduction of air or oxygen or by means of hydrogen peroxide, iodine, 1,2-diiodoethane or potassium ferricyanide. Sulphydryl-protecting groups which may be present can be removed prior to the oxidation or simultaneously therewith. A peptide of formula IV in which $R^5$ and $R^6$ are the same and each represent a hydrogen atom or a trityl, benzhydryl, acetamidomethyl, benzylthiomethyl or isobutyloxy-methyl group can be oxidized with, for example, dithiocyanogen [(SCN)$_2$] and a peptide of formula IV in which $R^5$ and $R^6$ are the same and each represent a hydrogen atom or a trityl or acetamidomethyl group can be oxidized with, for example, iodine.

The cleaving-off of protecting groups from a peptide of formula III or V can likewise be carried out in a generally known manner and under the conditions applicable to the individual groups.

All protecting groups known in connection with peptide syntheses can be used in the present process.

Examples of amino-protecting groups are those of the acyl type (e.g., formyl, benzoyl, phthalyl, trifluoroacetyl, p-tosyl, aryl- and alkylphosphoryl, phenyl- and benzylsulfonyl, trityl-sulfenyl, o-nitrophenylsulfenyl, γ-chlorobutyryl and o-nitrophenoxyacetyl), of the alkyl type (e.g., trityl, benzyl and alkylidene) and of the urethane type (e.g., carbobenzoxy, p-bromo-, p-chloro- and p-methoxycarbobenzoxy, tolyloxy-, allyloxy-, cyclopentyloxy-, cyclohexyloxy-, t-butyloxy- or 1,1-dimethylpropyloxy-, 2-(p-biphenylyl)-2-propyloxy-carbonyl and benzylthiocarbonyl). Further, amino groups can be protected by protonation. Examples of amide-protecting groups are xanthenyl, 2,4-dimethoxybenzyl, 2,4,6-trimethoxy-benzyl and 4,4'-dimethoxy-benzhydryl.

As particular protecting groups for the argenine residue there can, for example, be mentioned: p-tosyl, carbobenzoxy, p-nitrocarbobenzoxy, t-butoxy-, adamantyloxy- and isobornyloxy-carbonyl. The argenine residue can also be protected by protonation or nitration.

Examples of sulphydryl-protecting groups are alkyl- and arylthio groups (e.g., ethylthio, t-butylthio and phenylthio), alkyl and substituted alkyl groups (e.g., t-butyl, 2-diethoxy-carbonyl-ethyl, benzyl, trityl, p-methoxybenzyl, p-nitrobenzyl, benzylthiomethyl, acetamidomethyl and isobutyloxymethyl), acyl groups (e.g., carbobenzoxy, benzoyl, acetyl, p-methoxy-benzyloxycarbonyl and ethylamino-carbonyl) and the tetrahydropyran-2-yl group.

The starting materials of formulae III, IV and V are novel and it will be appreciated that they also form part of this invention.

The starting materials can be prepared in a manner known per se using the usual protecting groups, especially those mentioned earlier.

Examples of carboxyl-protecting groups are O- and S-esters (e.g., methyl, ethyl, t-butyl, benzyl, cyanomethyl, phthalimidomethyl, 4-picolyl, 2-p-tosylethyl, phenyl, p-nitrophenyl, thiophenyl and p-nitrobenzyl esters), amides and hydrazides (e.g., trityl, phenyl, carbobenzoxy and t-butoxycarbonyl hydrazide). Further, the carboxyl group can be protected by salt formation.

Examples of activated carboxyl groups are esters such as cyanomethyl, p-cyanophenyl, p-nitrophenyl, thiophenyl, p-nitrothiophenyl, 1-benztriazolyl, 1-succinimidyl, 1-piperidyl, 8-quinolyl, 5-chloro-8-quinolyl, 2-pyridyl and 2-thiopyridyl esters, and azides.

A peptide of formula IV or V can, for example, be prepared by the successive chain-lengthening of a dipeptide by one amino-acid unit either in solution or by solid phase techniques well known in the art or from two or several fragments. A peptide of formula V can be converted into a peptide of formula III by oxidation in a known manner. A peptide of formula III can, however, also be prepared, for example, by reacting a compound of the general formula

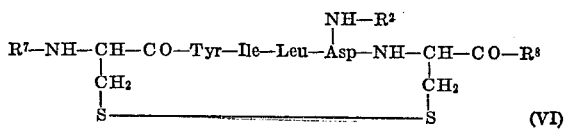

(VI)

wherein $R^7$ is an amino-protecting group and $R^8$ is a hydroxy group or a group activating the carboxyl group and $R^2$ is as above.

with a tripeptide of the general formula

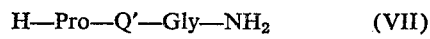

wherein Q' is as above.

The nonapeptides provided by the present invention have hormonal activity qualitatively similar to that of the neurohypophysal hormones. Of particular interest is their strong natriuretic activity. Both with regard to the strength of activity and with regard to the duration of activity, the nonapepides provided by the invention are superior to natural arginine-vasotocin ([Ile$^3$]-arginine-vasopressin) and to the [Leu$^4$]-oxytocin prepared by V. J. Hruby et al. [J. Biol. Chem. 244, 3890 (19690)], a neurohypophysal hormone analog, which displays the strongest natriuretic activity known hitherto. The blood pressure raising activity of the nonapeptides provided by the present invention is smaller than that of arginine-vasotocin, so that the natriuretic activity of the present nonapeptides is selectively raised in comparison with the blood pressure raising activity. A further advantage of the nonapeptides provided by the present invention, especially of [Ile$^3$,Leu$^4$]-arginine-vasopressin in comparison with arginine-vasotocin and [Leu$^4$] oxytocin, lies in that the sodium excretion is selectively strongly increased in comparison with the potassium excretion.

On the basis of the aforementioned biological activities, the present nonapeptides are suitable for the treatment of oedemas of various kinds and general disturbances of the electrolyte metabolism, especially those of sodium retention. The dosage should be adjusted according to individual requirements and can vary between 100 μg. to 10 mg. per individual dosage, administered on to several times per day.

The present nonapeptides can be administered in the form of the free bases or as salts with organic or inorganic acids or with polymers containing acid groups (such as, for example, carboxymethylcellulose or tannic acid), either alone or in the form of suitable pharmaceutical preparations for, for example, oral, parenteral, enteral or intranasal administration. For the preparation of pharmaceutical preparations, the nonapeptides can be processed with inorganic or organic adjuvants which are inert and physiologically acceptable.

Examples for such adjuvants are:

for tablets: lactose, starches, talcum and stearic acid;
for injection solutions: water, alcohols, glycerine and vegetable oils;
for suppositories: natural and hardened oils and waxes;
for intranasal spray-solutions: water, glycerine and other liquid substances which are tolerated by the mucous membrane.

The pharmaceutical preparations can also contain, for example, suitable preserving, stabilizing and wetting agents, as well as sweeteners, colorings and flavorings.

EXAMPLE 1

(a) Z-L-leucyl-L-asparaginyl-S-benzyl-L-cysteine methyl ester

A solution of 8.4 g. of L-asparaginyl-S-benzyl-L-cysteine methyl ester hydrobromide [prepared according to R. A. Boissonnas et al., Helv. 38, 1491 (1955)] in 30 ml. of dimethylformamide (DMF) was brought at —10° C. to a pH value of about 8 by the addition of 2.8 ml. of triethylamine and stirred up with 7.8 g. of Z-L-leucine p-nitrophenyl ester. The solidified mixture was diluted with about 70 ml. of water and the precipitate filtered off, washed with alcohol, ethyl acetate and ether and dried. Melting point 195°–197° C.; [α]$_D^{25}$=—28.0° (c.=1 in DMF).

(b) Z-L-leucyl-L-asparaginyl-S-benzyl-L-cysteine hydrazide

A solution of 3 g. of Z-l-leucyl-L-asparaginyl-S-benzyl-L-cysteine methyl ester in a mixture of 20 ml. of DMF and 5 ml. of dimethyl sulphoxide was treated at about 4° C. with 1.5 ml. of hydrazine hydrate. The mixture was allowed to stand for 24 hours at room temperature and filtered. By the addition of water to the filtrate there was obtained a precipitate which was filtered off, washed with water and dried. Melting point 230°–234° C.;

$$[\alpha]_D^{25} = -38.2°$$

(c.=1.1 in DMF).

(c) Z-L-leucyl-L-asparaginyl-S-benzyl-L-cysteinyl-L-prolyl-$N^G$-tosyl-L-arginyl-glycinamide A suspension of 2.25 g. of Z-L-leucyl-L-asparaginyl-S-benzyl-L-cysteine hydrazide in 25 ml. of DMF was treated at −20° C. with 6 ml. of 2.5 N HCl in tetrahydrofuran (THF). 1 ml. of isoamyl nitrite was added to the solution. The mixture was stirred for 30 minutes at −20° C., cooled to −30° C. and treated at this temperature, after neutralisation with 2.08 ml. of triethylamine, with a solution of 2.3 g. of L-prolyl-$N^G$-tosyl-L-arginyl-glycinamide, which was prepared by hydrogenating 3 g. of Z-L-prolyl-$N^G$-tosyl-L-arginyl-glycinamide [obtained according to R. L. Huguenin and R. A. Boissonnas, Helv. 45, 1629 (1962)] in methanol at normal pressure and room temperature over Pd/C, in a mixture of 10 ml. of DMF and 10 ml. of THF. The mixture was then stirred for 1 hour at −10° C., kept overnight in an ice-box, filtered and the filtrate concentrated in order to remove the THF. After dilution with DMF, the hexapeptide was precipitated by the addition of water and purified by washing with alcohol and ethyl acetate. Melting point 180°–182° C.; $[\alpha]_D^{25} = -40.6°$ (c.=0.5 in DMF).

(d) Z-S-benzyl-L-cysteinyl-L-tyrosyl-L-isoleucyl - L - leucyl-L-asparaginyl-S-benzyl-L-cysteinyl - L - prolyl-$N^G$-tosyl-L-arginyl-glycinamide A solution of 1.7 g. of Z-L-leucyl-L-asparaginyl-S-benzyl-L-cysteinyl-L-prolyl-$N^G$-tosyl-L-arginyl - glycinamide in 20 ml. of glacial acetic acid was treated with 20 ml. of 4 N HBr in glacial acetic acid. The mixture was stirred for 2 hours at room temperature, subsequently dropped into 500 ml. of ether and the precipitated hydrobromide washed with ether, dried and dissolved in 20 ml. of methanol. The solution was passed over a column of Dowex 2 (OH$^-$-form), the eluate concentrated under reduced pressure and the residue dissolved in 5 ml. of DMF. This solution was added to a solution of Z-S-benzyl-L-cysteinyl-L-tyrosyl-L-isoleucine azide which was obtained by dissolving 1.0 g. of Z-S-benzyl-L-cysteinyl-L-tyrosyl-L-isoleucine hydrazide [prepared according to R. A. Boissonnas et al., Helv. 38, 1491 (1955)] in a mixture of 5 ml. of DMF and 4 ml. of 2.5 N HCl in THF, treating the mixture at −20° C. with 0.4 ml. of isoamyl nitrite and neutralising it after stirring for 1 hour at −20° C. by the addition of 1.11 ml. of N-methylmorpholine. The mixture was stirred for 30 minutes at −20° C., subsequently kept for 25 hours at −30° C. and for 25 hours at +4° C., concentrated and filtered. The precipitate obtained by the addition of alcohol/water (1:1) to the filtrate was filtered off, dissolved in DMF, precipitated once again using ethyl acetate and finally washed with ethyl acetate and ether and dried; melting point 213°–216° C.;

$$[\alpha]_D^{25} = -40.2°$$

(c.=0.5 in DMF).

(e) [Ile$^3$,Leu$^4$]-arginine-vasopressin diacetate 500 mg. of Z-S-benzyl-L-cysteinyl-L-tyrosyl-L-isoleucyl-L - leucyl-L-asparaginyl-S-benzyl-L-cysteinyl - L - prolyl-$N^G$-tosyl-L-arginyl-glycinamide in 400 ml. of liquid ammonia were reduced with sodium. After removal of the ammonia, the residue was dissolved in 500 ml. of water which contained a few drops of glacial acetic acid and the solution adjusted to pH 6.8 with NaOH. 66.5 ml. of a 0.01 M $K_3[Fe(CN)_6]$ solution were thereupon added, the pH value being held at 6.5–7.0 by the addition of some NaOH. The mixture was kept for 15 hours at room temperature and passed over a column of Amberlite IR–45 (Cl$^-$-form). The eluate was acidified with acetic acid and adsorbed on Amberlite CG–50 (H$^+$-form). After washing with 500 ml. of 0.2% acetic acid, it was eluted with a mixture of pyridine/glacial acetic acid/water (30:4:66) and the eluate lyophilised twice with intermediate uptake with water. For further purification, the lyophilisate was dissolved in 3 ml. of a 0.5 M ammonium acetate buffer (pH=6.4) and chromatographed once more on a column of Amberlite CG–50 (H$^+$-form). The eluate was lyophilized several times. Yield: 120 mg.; $[\alpha]_D^{25} = -10.9°$ (c.=0.5, in 1 N acetic acid).

Paper electrophoresis: Buffer of 2 ml. of glacial acetic acid and 20 ml. of pyridine, made up with water to 1 liter (pH=6.0): $R_f$ (arginine)=0.51±0.05.

Buffer of 37 ml. of formic acid and 25 ml. of acetic acid, made up with water to 1 liter (pH=1.7): $R_f$ (arginine)=0.52±0.05.

The crude [Ile$^3$,Leu$^4$]-arginine-vasopressin can also be purified by subjecting the eluate, after removal of the ferricyanide and ferrocyanide ions by means of Amberlite IR–45 (Cl$^-$-form), to partition chromatography on Sephadex G–25 with the solvent systems 1-butanol/pyridine/0.2 N acetic acid (10:7:24) and 1-butanol/ethanol/pyridine: 0.2 N acetic acid (16:1:2:28).

EXAMPLE 2

(a) Z-L-leucyl-L-asparaginyl-S-benzyl-L-cysteinyl-L-prolyl-$N^G$-tosyl-L-arginyl-glycinamide 18.0 g. of Z-L-asparaginyl-S-benzyl-L-cysteinyl-L-prolyl-$N^G$-tosyl - L - arginyl-glycinamide [prepared according to R. L. Huguenin and R. A. Boissonnas, Helv. 49, 695 (1966)] were dissolved in 100 ml. of glacial acetic acid and treated with 100 ml. of a 5 N HBr/glacial acetic acid solution. The mixture was stirred for 45 minutes at room temperature and subsequently dropped into 1 liter of ether. The precipitated hydrobromide of the pentapeptide was washed with ether, dried over KOH and $P_2O_5$ and dissolved in 100 ml. of methanol. The solution was passed over a column of Dowex 2 (OH$^-$-form), the eluate concentrated under reduced pressure and the residue dissolved in 100 ml. of DMF. The solution was treated at 0° C. with 8.5 g. of Z-L-Leu-OPhNO$_2$, the mixture kept for 3 days at room temperature and the protected hexapeptide precipitated by the addition of 1 liter of ethyl acetate, washed with ether and ethyl acetate and dried. Yield: 16.3 g.; melting point 183–185° C.; $[\alpha]_D^{25} = -41.6°$ (c.=0.5 in DMF).

(b) Z-L-isoleucyl-L-leucyl - L - asparaginyl - S - benzyl-L-cysteinyl-L-prolyl-$N^G$-tosyl-L-arginyl-glycinamide The Z-protecting group was cleaved off from 16.0 g. of Z-L-leucyl-L-asparaginyl - S - benzyl-L-cysteinyl-L-prolyl-$N^G$-tosyl-L-arginyl-glycinamide in the manner described in part (a) and the free amine obtained was reacted with 6.0 g. of Z-L-Ile-OPhNO$_2$ in 100 ml. of DMF. The mixture was kept for 2 days at room temperature and the protected heptapeptide precipitated by the addition of 1 liter of ethyl acetate and the precipitate washed with ether, ethyl acetate and isopropanol and dried. Yield: 13.1 g.; melting point 211°–212° C.; $[\alpha]_D^{25} = -41.9°$ (c.=0.5 in DMF).

(c) Z-O-benzyl - L - tyrosyl - L - isoleucyl - L - leucyl-L-asparaginyl-S-benzyl-L-cysteinyl - L - prolyl-$N^G$-tosyl-L-arginyl-glycinamide The Z-protecting group was cleaved off from 10.0 g. of Z-L-isoleucyl - L - leucyl - L - asparaginyl - S - benzyl-L-cysteinyl - L - prolyl - $N^G$ - tosyl - L - arginyl-glycinamide in the manner described in part (a) and the resulting free amine reacted with 4.5 g. of Z-O-benzyl-L-Tyr-OPhNO$_2$ in 100 ml. of DMF. After standing for 3 days at room temperature, by the addition of ethyl acetate there was precipitated the protected octapeptide which was washed with ethyl acetate and ethanol, reprecipitated from glacial acetic acid/ethanol, washed with ethanol and dried. Yield: 8.4 g.; melting point 237°–238° C.; $[\alpha]_D^{24} = -36.2$ (c.=0.5 in DMF).

(d) Z-S-benzyl-L-cysteinyl-L-tyrosyl-L-isoleucyl-L-leucyl-L-asparaginyl-S-benzyl - L - cysteinyl-L-prolyl-N$^G$-tosyl-L-arginyl-glycinamide 7.0 g. of Z-O-benzyl-L-tyrosyl-L-isoleucyl-L-leucyl-L-asparaginyl-S-benzyl-L-cysteinyl - L - prolyl-N$^G$-tosyl-L-arginyl-glycinamide were dissolved in 50 ml. of glacial acetic acid and treated with 50 ml. of a 5 N HBr/glacial acetic acid solution. After stirring for 1 hour, the mixture was dropped into 1 litre of ether, the precipitate filtered off, washed with ether, reprecipitated from ethanol/ether and dried over P$_2$O$_5$ and KOH. The hydrobromide of the octapeptide thus obtained was dissolved in 50 ml. of DMF. The solution was brought to pH 7.5 by the addition of ethyldiisopropylamine and treated with 2.7 g. of Z-S-benzyl-L-Cys-OPhNO$_2$. After standing for 3 days at room temperature, the protected nonapeptide was precipitated by the addition of ethanol, washed with ethyl acetate and ethanol and dried. Yield: 4.7 g.; melting point 220°–223° C.; $[\alpha]_D^{24} = -42.6°$ (c.=0.5 in DMF).

(e) [Ile$^3$,Leu$^4$]-arginine-vasopressin diacetate

The protected nonapeptide was converted into the desired [Ile$^3$,Leu$^4$]-arginine-vasopressin diacetate in the manner described in Example 1.

EXAMPLE 3

(a) Z-L-leucyl-L-asparaginyl-S-benzyl-L-cysteinyl-L-prolyl-N$^\epsilon$-tosyl-L-lysyl-glycinamide A suspension of 2.4 g. of Z-L-leucyl-L-asparaginyl-S-benzyl-L-cysteine hydrazide in 25 ml. of DMF was treated at −20° C. with 10.8 ml. of 2.5 N HCl in THF. 1 ml. of isoamyl nitrite was added to this solution. The mixture was stirred for 40 minutes at −20° C., cooled to −30° C. and treated at this temperature, after neutralisation with 3.04 ml. of N-methyl-morpholine, with a solution of 1.9 g. of L-prolyl-N$^\epsilon$-tosyl-L-lysyl-glycinamide, which was prepared by hydrogenating 2.5 g. of Z-L-prolyl-N$^\epsilon$-tosyl-L-lysyl-glycinamide [obtained according to J. Meienhofer and V. du Vigneaud, J. Am. Chem. Soc. 82, 2279 (1960)] in methanol at normal pressure and room temperature over Pd/C, in 10 ml. of DMF. The mixture was then stirred for 1 hour at −20° C., kept overnight at 4° C. and filtered. The protected hexapeptide was precipitated by the addition of 1% aqueous acetic acid to the filtrate, filtered off, washed with alcohol and ethyl acetate, digested with hot alcohol and dried. Yield: 1.9 g.; melting point 217°–218° C.; $[\alpha]_D^{25} = -43.9°$ (c.=1 in DMF).

(b) Z-L-isoleucyl-L-leucyl-L-asparaginyl-S-benzyl-L-cysteinyl-L-prolyl-N'-tosyl-L-lysyl-glycinamide A solution of 1.2 g. of Z-L-leucyl-L-asparaginyl-S-benzyl-L-cysteinyl-L-prolyl-N$^\epsilon$-tosyl-L-lysyl - glycinamide in 15 ml. of glacial acetic acid was treated with 15 ml. of 5 N HBr in glacial acetic acid. The mixture was stirred for 1 hour at room temperature, subsequently dropped into 300 ml. of ether and the precipitated hydrobromide washed with ether, dried and dissolved in 20 ml. of methanol. The solution was passed over a column of Dowex 2 (OH−-form), the eluate concentrated under reduced pressure and the residue dissolved in 20 ml. of DMF. The solution was treated with 0.54 g. of Z-L-Ile-OPhNO$_2$, the mixture kept for 2 days at room temperature and the protected heptapeptide precipitated by the addition of ethyl acetate, washed with ethyl acetate and alcohol and dried. Yield: 0.85 g., melting point 224°–227° C.; $[\alpha]_D^{25} = -43.9°$ (c.=0.5 in DMF).

(c) Tosyl-S-benzyl-L-cysteinyl - L - tyrosyl-L-isoleucyl-L-leucyl-L-asparaginyl - S - benzyl-L-cysteinyl-L-prolyl-N$^\epsilon$-tosyl-L-lysyl-glycinamide The Z-protecting group was cleaved off from 0.8 g. of Z-L-isoleucyl - L-leucyl-L-asparaginyl-S-benzyl-L-cysteinyl-L-prolyl-N'-tosyl-L-lysyl-glycinamide in the manner described in part (b) and the free amine obtained dissolved in 6 ml. of DMF. This solution was added to a solution of tosyl-S-benzyl-L-cysteinyl-L-tryrosine azide which was obtained by dissolving 0.31 g. of tosyl-S-benzyl-L-cysteinyl-L-tyrosine hydrazide [obtained according to J. Honzl and J. Rudinger, Coll. Czech. Chem. Comm. 20, 1190 (1955)] in a mixture of 3 ml. of DMF and 1.5 ml. of 2.5 N HCl in THF, treating the mixture at −20° C. with 0.15 ml. of isoamyl nitrite and neutralising it, after stirring for 40 minutes at −20° C., by the addition of 0.42 ml. of N-methylmorpholine. The mixture was stirred for 1 hour at −20° C., kept for 8 days at 4° C. and filtered. The precipitate obtained by the addition of water to the filtrate was filtered off, suspended in boiling alcohol, filtered, dissolved in a little DMF, again precipitated by the addition of alcohol and dried. Yield: 0.47 g.; melting point 223°–225° C.; $[\alpha]_D^{25} = -29.8°$ (c.=0.5, in DMF).

(d) [Ile$^3$,Leu$^4$]-Lysine-vasopressin diacetate

The conversion of 250 mg. of tosyl-S-benzyl-L-cysteinyl-L-tyrosyl - L - leucyl-L-asparaginyl-S-benzyl-L-cysteinyl-L-prolyl-N$^\epsilon$-tosyl-L-lysyl-glycinamide into [Ile$^3$,Leu$^4$]-lysine-vasopressin diacetate was carried out in analogy to the method described in Example 1. Yield: 99 mg. $[\alpha]_D^{25} = -3.6°$ (c.=0.5 in 1 N acetic acid).

Paper electrophoresis: Buffer of 2 ml. of glacial acetic acid and 20 ml. of pyridine, made up with water to 1 litre (pH=6.0): R$_f$ (lysine)=0.59±0.05. Buffer of 37 ml. of formic acid and 25 ml. of acetic acid, made up with water to 1 litre (pH=1.7): R$_f$ (lysine)=0.44±0.05.

EXAMPLE 4

Sublingual tablets contain the following ingredients:

(a)

| | Mg. |
|---|---|
| [Ile$^3$,Leu$^4$]-arginine-vasopressin diacetate | 5.83 |
| Lactose | 66.17 |
| Sugar, powdered | 20.00 |
| Kollidon K 25 | 7.00 |
| Magnesium stearate | 1.00 |
| | 100.00 |

(b)

| | Mg. |
|---|---|
| [Ile$^3$,Leu$^4$]-arginine vasopressin diacetate | 11.66 |
| Lactose | 71.34 |
| Mannitol | 60.00 |
| Hydroxypropyl-methylcellulose | 5.00 |
| Magnesium stearate | 2.00 |
| | 150.00 |

EXAMPLE 5

An injection solution in ampoules of 5 ml. contains the following ingredients per ml.:

| | Mg. |
|---|---|
| [Ile$^3$,Leu$^4$]-arginine-vasopressin diacetate | 0.12 |
| NaCl | 9.00 |
| HCl 0.1-N ad pH 3.5 q.s. | |
| H$_2$O ad inject—ad 1.0 ml. | |

9

EXAMPLE 6

A lyophilisate contains the following ingredients:

|  | Parts by weight |
|---|---|
| [Ile³,Leu⁴]-arginine-vasopressin diacetate | 11.60 |
| L-malic acid | 1.74 |
| D-mannitol | 150.00 |
|  | 163.34 |

In order to produce an injection solution which is ready for use 163.34 g. of this lyophilisate are dissolved in 10 ml. of distilled water.

We claim:

1. A compound of the general formula

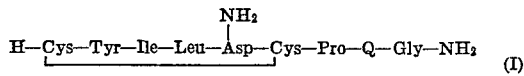

(I)

wherein Q is the residue of arginine or lysine and pharmaceutically useful non-toxic acid addition salts thereof.

2. The compound of claim 1 of the formula

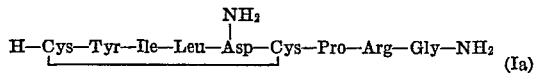

(Ia)

and pharmaceutically utilizable non-toxic acid addition salts thereof.

3. The compound of claim 2 which is [Ile³,Leu⁴]-arginine-vasopressin diacetate.

4. The compound of claim 1 of the formula

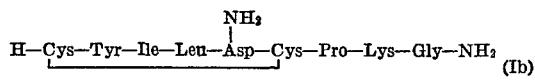

(Ib)

and pharmaceutically useful non-toxic acid addition salts thereof.

5. [Ile³,Leu⁴]-lysine-vasopressin diacetate.

6. A peptide of the general formula

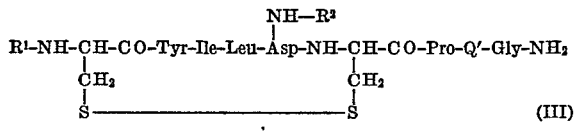

(III)

wherein $R^1$ is a hydrogen atom or an amino-protecting group; $R^2$ is a hydrogen atom or an amide-protecting group and Q' is a grouping of the formula

—NH—CH[—(CH$_2$)$_3$—NH—C(=NH)—NHR³]—CO— or

—NH—CH[—(CH$_2$)$_4$—NH—R⁴]—CO— in which $R^3$ is a hydrogen atom or a group protecting the guanidine residue and $R^4$ is a hydrogen atom or an amino-protecting group protecting the glycine residue (provided that at least one of $R^1$, $R^2$, and $R^3$ or $R^4$ represents a protecting group).

10

7. A peptide of the general formula

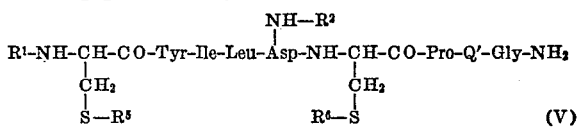

(V)

wherein $R^1$ is a hydrogen atom or an amino-protecting group; $R^2$ is a hydrogen atom or an amide-protecting group; Q' is a grouping of the formula

—NH—CH[—(CH$_2$)$_3$—NH—C(=NH)—NHR³]—CO— or

—NH—CH[—(CH$_2$)$_4$—NH—R⁴]—CO— in which $R^3$ is a hydrogen atom or a group protecting the guanidine residue; $R^4$ is a hydrogen atom or an amino-protecting group protecting the lysine residue; and $R^5$ and $R^6$ each are a hydrogen atom or a sulphydryl-protecting group.

8. A peptide of the general formula

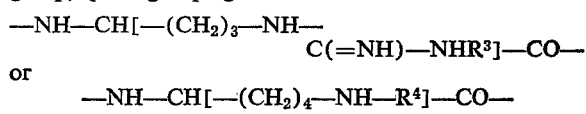

(IV)

wherein Z is the residue of lysine or arginine; and $R^5$ and $R^6$ each are a hydrogen atom or a sulphydryl-protecting group.

9. Z-L-leucyl-L-asparaginyl - S - benzyl - L - cysteine methyl ester.

10. Z-L-leucyl-L-asparaginyl - S - benzyl - L - cysteine hydrazide.

11. Z-L-leucyl-L-asparaginyl - S - benzyl - L - cysteinyl-L-prolyl-N$^G$-tosyl-L-arginyl-glycinamide.

12. Z-S-benzyl-L-cysteinyl - L - tyrosyl - L - isoleucyl-L-leucyl-L-asparaginyl-S-benzyl - L - cysteinyl - L - prolyl-N$^G$-tosyl-L-arginyl-glycinamide.

13. Z-L-isoleucyl-L-leucyl - L - asparaginyl - S - benzyl-L-cysteinyl-L-prolyl-N$^G$-tosyl-L-arginyl-glycinamide.

14. Z-O-benzyl-L-tyrosyl - L - isoleucyl - L - leucyl-L-asparaginyl-S-benzyl - L - cysteinyl - L - prolyl-N$^G$-tosyl-L-arginyl-glycinamide.

15. Z-L-leucyl-L-asparaginyl - S - benzyl - L - cysteinyl-L-prolyl-N$^ε$-tosyl-L-lysyl-glycinamide.

16. Tosyl-S-benzyl - L - cysteinyl - L - tyrosyl - L - isoleucyl-L-leucyl-L-asparaginyl - S - benzyl - L - cysteinyl-L-prolyl-N$^ε$-tosyl-L-lysyl-glycinamide.

References Cited

B. Berde and R. Boissonnas: "Handbook of Experimental Pharmacology," v. 23, Eicher et al., eds., Springer-Verlag, Berlin (1968), pp. 806, 844, 824–25.

Pettit: "Synthetic Peptides," v. 1, Reinhold Co., N.Y. (1970), pp. 190, 288, 316, 356–57.

Konzett: *Pharmacology of Oxytocin, Vasopressin and Analogues*, in "Polypeptides," vol. 4, Schlacter, ed., Pergamon, N.Y. (1960), p. 25.

LEWIS GOTTS, Primary Examiner

R. J. SUYAT, Assistant Examiner

U.S. Cl. X.R.

424—177

UNITED STATES PATENT AND TRADEMARK OFFICE
CERTIFICATE OF CORRECTION

PATENT NO. : 3,816,385
DATED : June 11, 1974
INVENTOR(S) : Dieter Gillessen, Josef Rudinger and Rolf Studer It is certified that error appears in the above-identified patent and that said Letters Patent are hereby corrected as shown below:

Column 1,

Foreign Application Priority Data:

June 18, 1971    Switzerland    No. 8921/71

Column 9, line 32 "$[Lle^3,Leu^4]-$" should be:

$$[Ile^3,Leu^4]-$$

Column 9, line 42 "$[Lle^3,Leu^4]-$" should be:

$$[Ile^3,Leu^4]-$$

Signed and Sealed this

Thirteenth Day of July 1976

[SEAL]

Attest:

RUTH C. MASON
*Attesting Officer*

C. MARSHALL DANN
*Commissioner of Patents and Trademarks*